United States Patent
Nakagawara

(10) Patent No.: US 9,794,491 B2
(45) Date of Patent: Oct. 17, 2017

(54) IMAGING APPARATUS HAVING ANTI-FLICKER TIMING OFFSET, CONTROL METHOD, AND STORAGE MEDIUM THEREFOR

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 523 days.

(21) Appl. No.: 14/267,809

(22) Filed: May 1, 2014

(65) Prior Publication Data

US 2014/0333825 A1    Nov. 13, 2014

(30) Foreign Application Priority Data

May 10, 2013  (JP) .................................. 2013-100547

(51) Int. Cl.
*H04N 5/235*     (2006.01)

(52) U.S. Cl.
CPC ........... *H04N 5/2357* (2013.01); *H04N 5/235* (2013.01); *H04N 5/2353* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,471,316 B2* | 12/2008 | Takahashi | .............. | H04N 5/235 348/226.1 |
| 7,598,987 B2* | 10/2009 | Desprez-Le Goarant | ............... | H04N 5/2351 330/254 |
| 2006/0152598 A1* | 7/2006 | Kawarada | .......... | H04N 5/23248 348/226.1 |
| 2007/0126895 A1* | 6/2007 | Desprez-Le Goarant | ............... | H04N 5/2351 348/255 |
| 2008/0309791 A1* | 12/2008 | Nishiwaki | .......... | H04N 5/23293 348/226.1 |
| 2011/0050951 A1* | 3/2011 | Morino | .................. | H04N 5/232 348/226.1 |
| 2011/0157415 A1* | 6/2011 | Goh | ..................... | H04N 5/2357 348/226.1 |
| 2011/0181753 A1* | 7/2011 | Sugie | ................. | H04N 5/23296 348/226.1 |
| 2011/0292241 A1* | 12/2011 | Segapelli | ............. | H04N 5/2357 348/226.1 |

(Continued)

FOREIGN PATENT DOCUMENTS

JP     2006-222935 A     8/2006
JP      2006352242 A    12/2006

(Continued)

*Primary Examiner* — Twyler Haskins
*Assistant Examiner* — Akshay Trehan
(74) *Attorney, Agent, or Firm* — Canon USA Inc., IP Division

(57) ABSTRACT

An imaging apparatus has a first mode in which a determination unit determines an exposure timing of an imaging unit based on a timing calculated by a calculation unit after a light metering unit performs light metering a first number of times, and a second mode in which the determination unit determines the exposure timing of the imaging unit based on the timing calculated by the calculation unit after the light metering unit performs the light metering a second number of times.

12 Claims, 10 Drawing Sheets

(56) References Cited

U.S. PATENT DOCUMENTS

2014/0211041 A1* 7/2014 McCrackin ............ H04N 9/735
　　　　　　　　　　　　　　　　　　　　　　348/223.1

FOREIGN PATENT DOCUMENTS

| JP | 2009100275 A | 5/2009 |
| JP | 2010114834 A | 5/2010 |
| JP | 2012109794 A | 6/2012 |

* cited by examiner

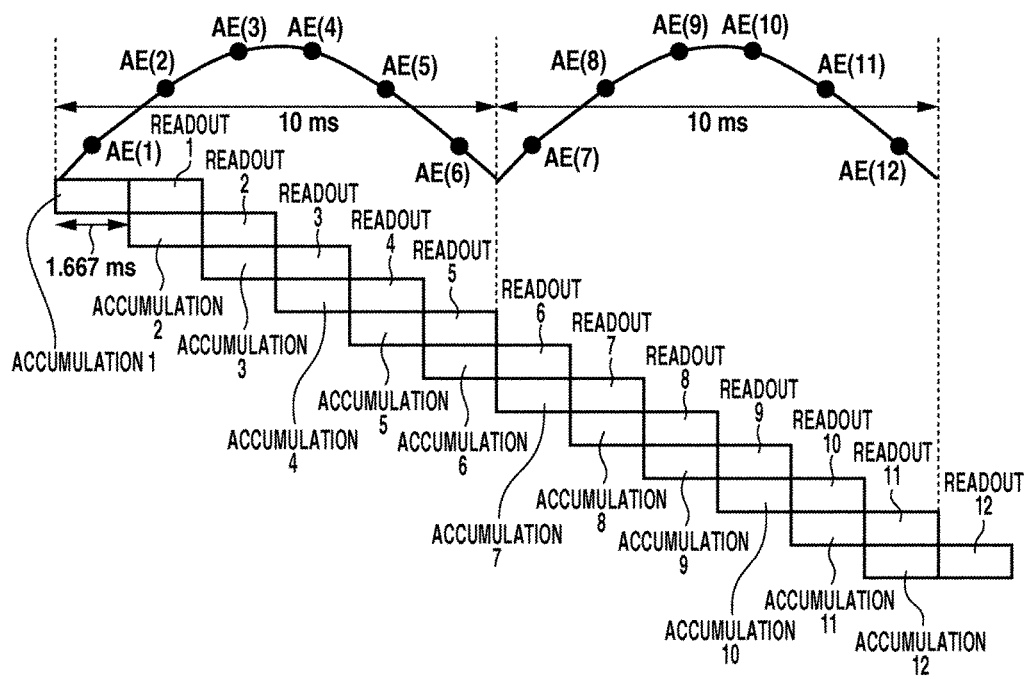
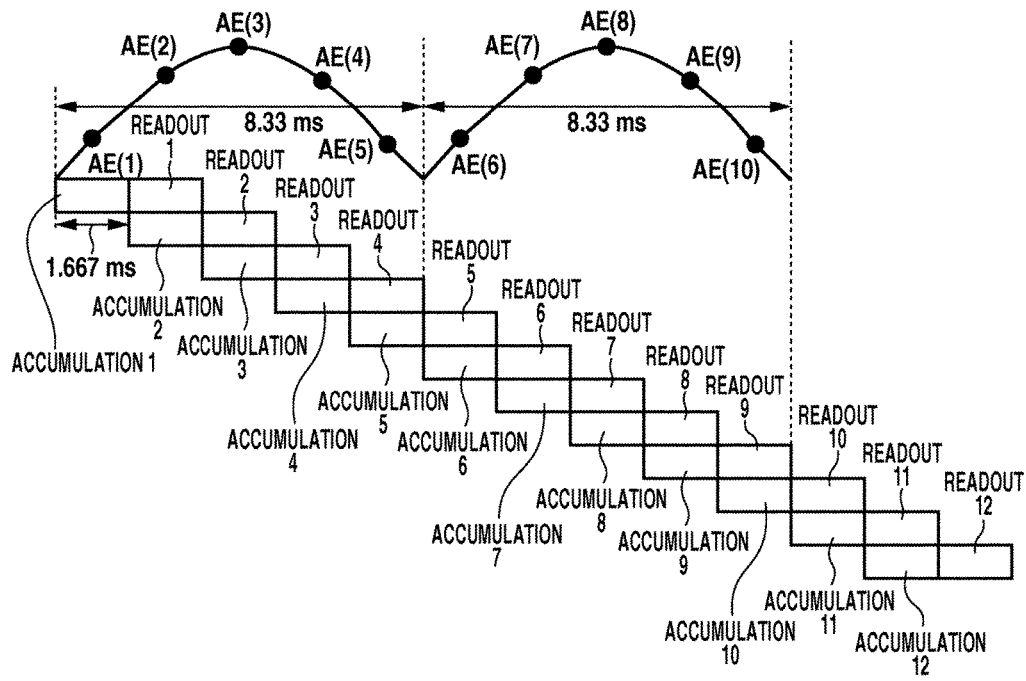

FIG.4

| VERTICAL PIXEL ADDITION NUMBER | READOUT TIME (1V TIME) |
|---|---|
| 1 (READ OUT ALL PIXELS) | 6.25 ms |
| 2 | 3.63 ms |
| 3 | 2.75 ms |
| 4 | 2.33 ms |
| 5 | 2.09 ms |
| 6 | 1.90 ms |
| 7 | 1.81 ms |
| 8 | 1.73 ms |
| 9 | 1.66 ms |
| 10 | 1.62 ms |

FIG.7

| SHUTTER SPEED | T_ShutterWait |
|---|---|
| 1/125 ~ 1/160 | 0 ms |
| 1/161 ~ 1/200 | 1.5 ms |
| 1/201 ~ 1/250 | 2 ms |
| 1/251 ~ 1/500 | 3 ms |
| 1/501 ~ 1/1000 | 3.5 ms |
| 1/1001 ~ 1/2000 | 3.75 ms |
| 1/2001 ~ | 4 ms |

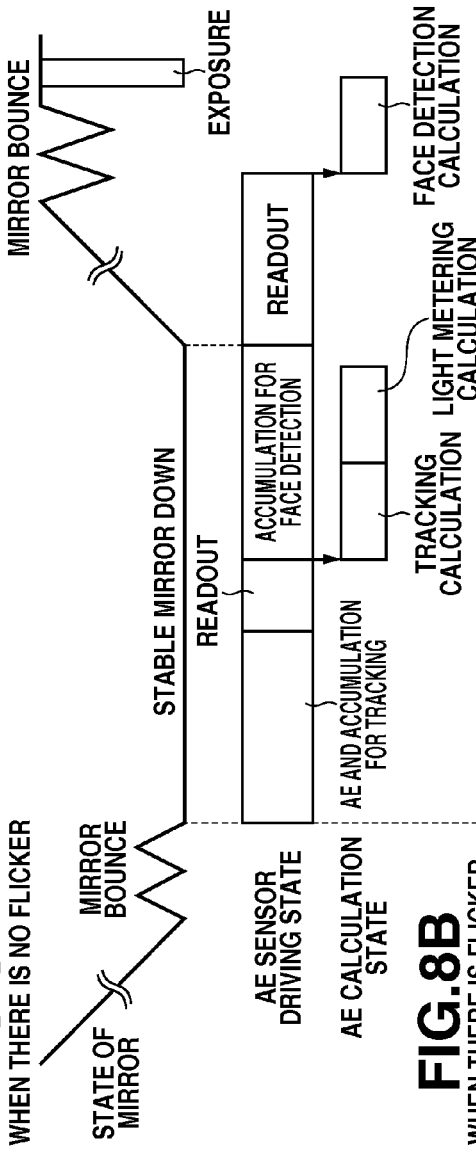
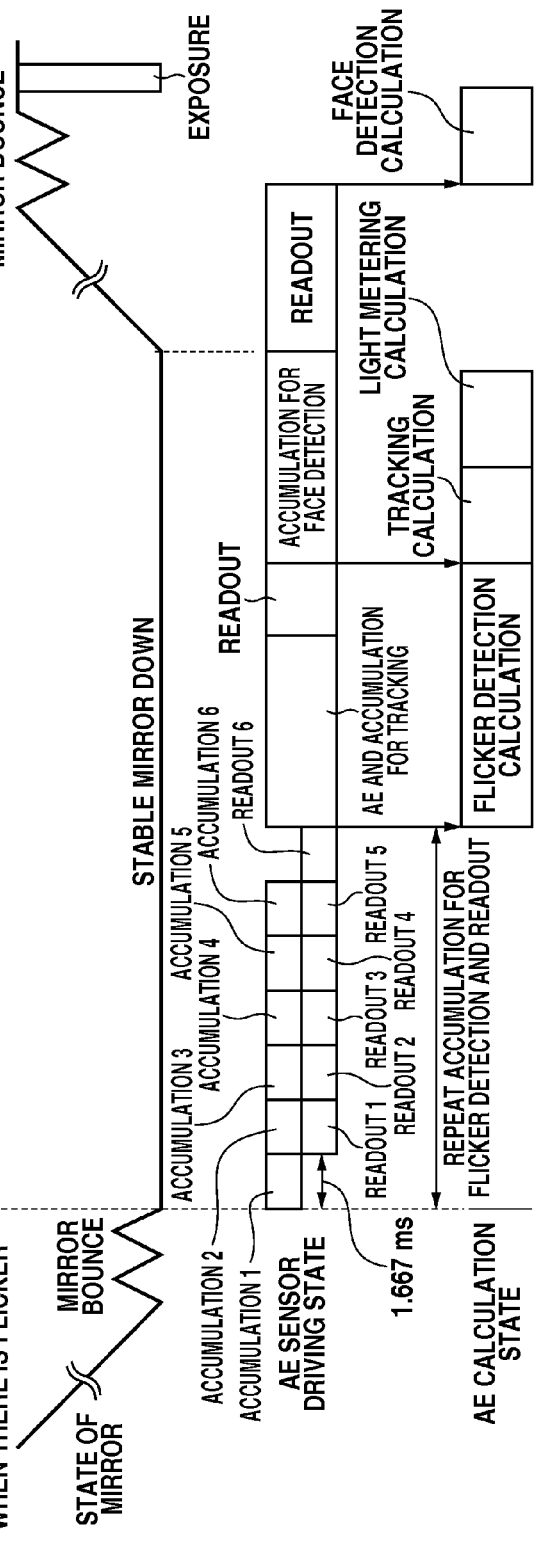
FIG.8A WHEN THERE IS NO FLICKER
FIG.8B WHEN THERE IS FLICKER

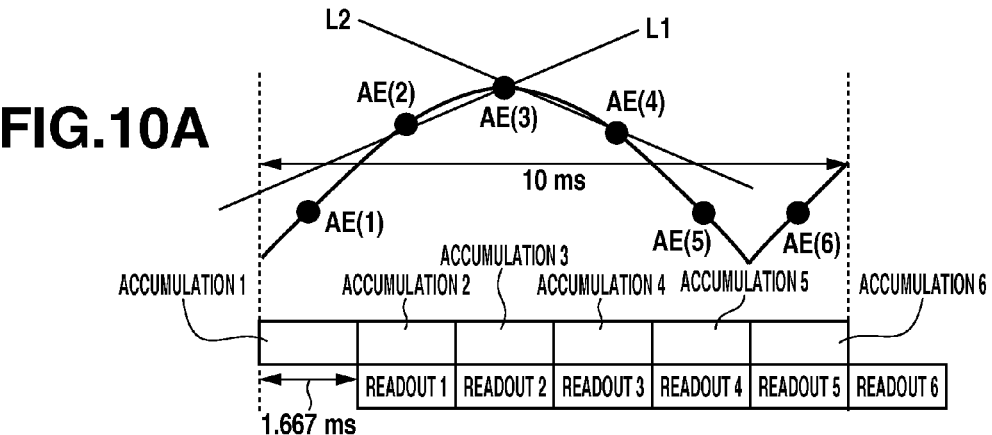
FIG.10A
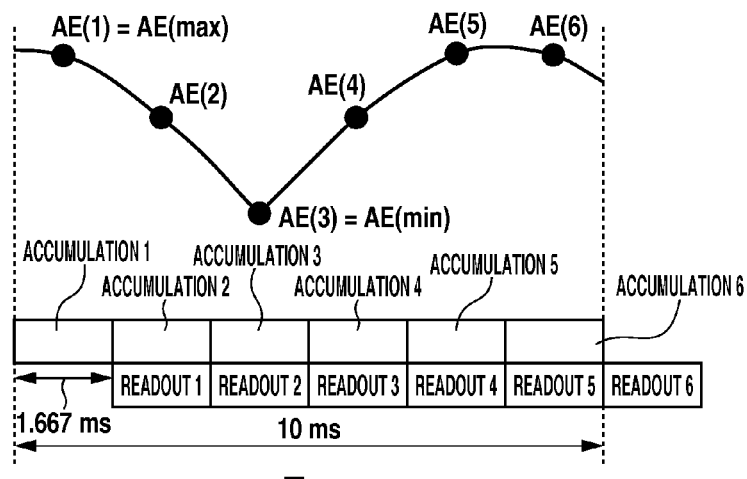
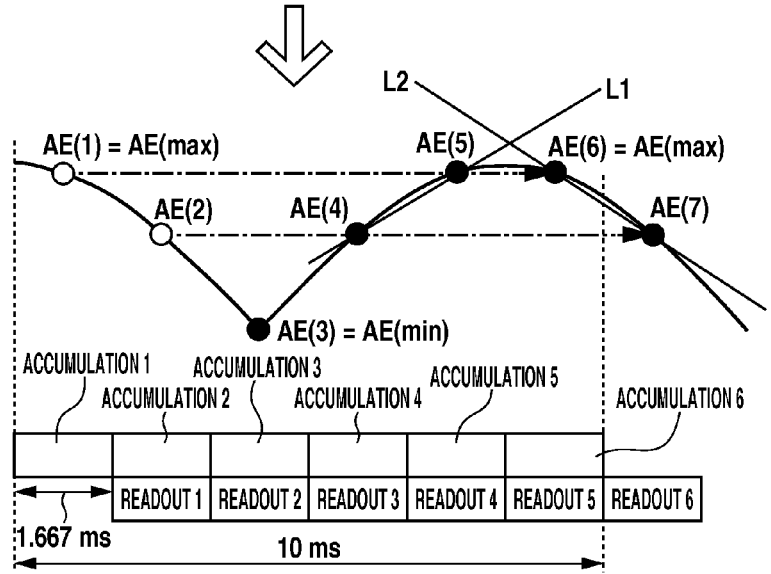
FIG.10B

IMAGING APPARATUS HAVING ANTI-FLICKER TIMING OFFSET, CONTROL METHOD, AND STORAGE MEDIUM THEREFOR

BACKGROUND OF THE INVENTION

Field of the Invention

The present invention relates to an imaging apparatus, and more particularly, a technique for suppressing an influence of flicker generated under an artificial light source such as a fluorescent lamp.

Description of the Related Art

In recent years, the sensitivity of an imaging apparatus such as a digital camera or a mobile phone camera has been becoming higher. Therefore, a bright image with suppressed blur can be acquired by shooting with a high shutter speed (i.e., with a short exposure time) even under a relatively dark environment such as an indoor environment.

In the case of a fluorescent lamp, which is commonly used as an indoor light source, there occurs flicker known as a phenomenon that illumination light periodically fluctuates due to an influence of a commercial power supply frequency. When shooting with a high shutter speed under a light source that causes such flicker (hereinafter referred to as flickering light source), exposure unevenness and color unevenness may occur in one image, or variations in exposure and color temperature may occur among a plurality of images continuously captured.

To solve such a problem, Japanese Patent Application Laid-Open No. 2006-222935 discusses a technique for detecting a state of flicker of illumination light and adjusting an imaging timing so that the center of an exposure period substantially matches a timing at which a light amount of the illumination light takes a maximal value.

However, in the technique discussed in Japanese Patent Application Laid-Open No. 2006-222935, when a plurality of images is continuously captured, each imaging timing is adjusted based on a phase of the maximal value of the light amount of the illumination light detected before the continuous capturing of the plurality of images is started. Thus, the following problem occurs.

Generally, it has been known that a fluctuation (e.g., a fluctuation of approximately ±0.2 Hz in Japan) occurs in a commercial power supply frequency from a reference frequency. More specifically, a fluctuation, which is approximately two times the fluctuation in the commercial power supply frequency, occurs in a flickering cycle of the flickering light source from a reference flickering cycle. Therefore, when a time elapsed since the flicker has been detected is lengthened, a peak timing of a light amount of the flickering light source obtained from a detection result of the flicker easily deviates from an actual peak timing of the light amount of the flickering light source.

Therefore, in the technique discussed in Japanese Patent Application Laid-Open No. 2006-222935, the later the time when the image is captured in the capturing of the plurality of images is, the more easily the peak timing obtained from the detection result deviates from the actual peak timing, and the more difficult it becomes to suppress an influence of the flicker.

SUMMARY OF THE INVENTION

According to an aspect of the present invention, an imaging apparatus includes an imaging unit, a light metering unit, a calculation unit configured to calculate a timing at which a light amount of light from a subject satisfies a predetermined condition, based on a plurality of light metering results obtained by the light metering unit performing light metering a plurality of times, and a determination unit configured to determine an exposure timing of the imaging unit, wherein the imaging apparatus has a first mode in which the determination unit determines the exposure timing of the imaging unit based on the timing calculated by the calculation unit after the light metering unit performs the light metering a first number of times, and a second mode in which the determination unit determines the exposure timing of the imaging unit based on the timing calculated by the calculation unit after the light metering unit performs the light metering a second number of times, and wherein each of the first and second numbers of times includes a plurality of times, and the second number of times is smaller than the first number of times.

Further features of the present invention will become apparent from the following description of exemplary embodiments with reference to the attached drawings.

BRIEF DESCRIPTION OF THE DRAWINGS

FIGS. 3A and 3B respectively illustrate timings of accumulation of charge for flicker detection and timings of readout of an image signal.

FIG. 4 illustrates a relationship between a vertical pixel addition number and a readout time.

FIG. 7 illustrates a table in which a value of T_ShutterWait is associated with a value of a shutter speed.

FIGS. 8A and 8B illustrate an operation sequence of a light metering sensor and an ICPU between frames of continuous shooting.

FIGS. 10A and 10B illustrate timing calculation of a feature point of flickering under a flickering light source having a commercial power supply of 60 Hz.

DESCRIPTION OF THE EMBODIMENTS

Various exemplary embodiments, features, and aspects of the invention will be described in detail below with reference to the drawings.

Figure 1:
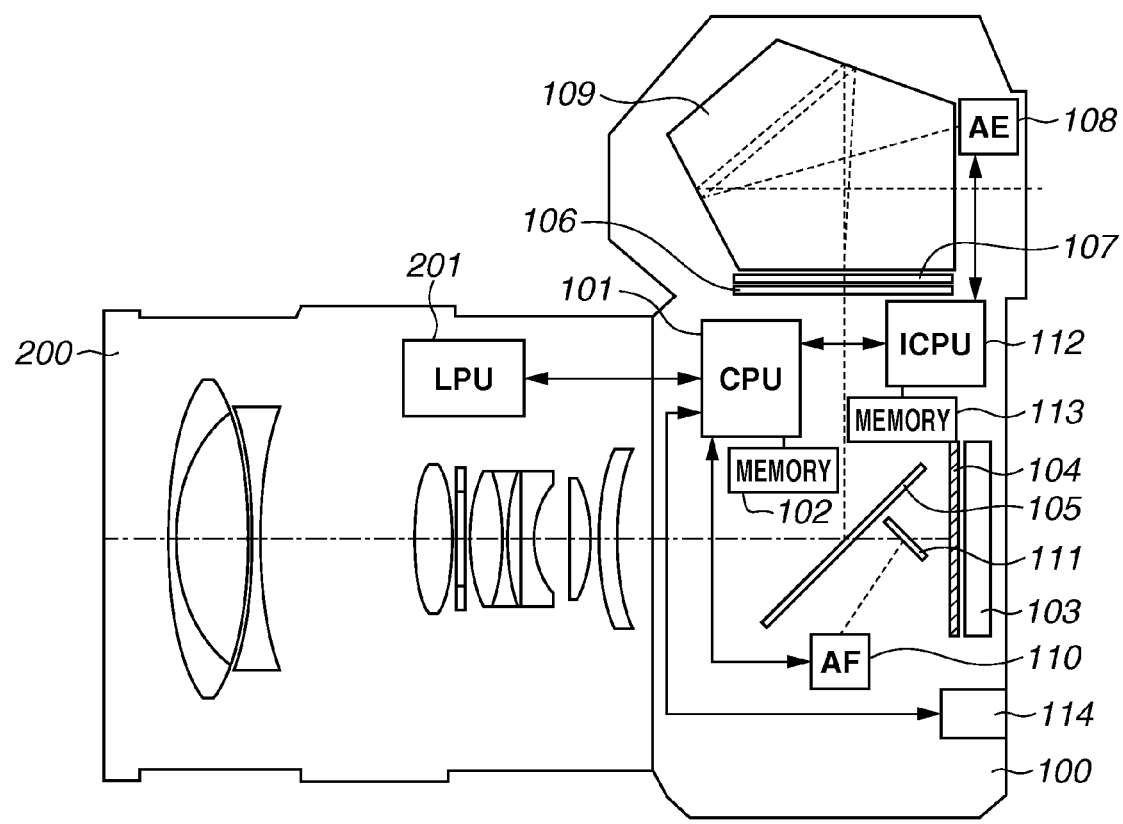
FIG. 1 is a schematic view illustrating a configuration of an imaging apparatus according to an exemplary embodiment of the present invention.

FIG. 1 is a schematic view illustrating a configuration of an imaging apparatus according to an exemplary embodiment. The imaging apparatus according to the present exemplary embodiment includes a camera body 100 and a lens unit 200 detachably attached to the camera body 100.

A configuration of the camera body 100 will be described below. A microcomputer central processing unit (CPU) (hereinafter referred to as a camera microcomputer) 101 controls each unit in the camera body 100. A memory 102 is a memory such as a random access memory (RAM) or a read-only memory (ROM) connected to the camera microcomputer 101.

An image sensor 103 is an image sensor such as a charge coupled device (CCD) sensor or a complementary metal oxide semiconductor (CMOS) sensor including an infrared cut filter and a low-pass filter, and photoelectrically converts a light flux incident thereon via the lens unit 200 to output an image signal.

A shutter 104 travels to enter a light shielding state where the image sensor 103 is shielded from the light flux incident thereon via the lens unit 200 and a retreating state where the light flux incident thereon via the lens unit 200 is guided to the image sensor 103.

A half mirror 105 is movable to a position where the light flux incident thereon via the lens unit 200 is guided to the image sensor 103 (a mirror up state) and a position where the light flux is guided to a light metering sensor 108 (a mirror down state). In other words, the half mirror 105 changes an optical path of the light flux incident thereon via the lens unit 200 to a state where the light flux is guided to the image sensor 103 and a state where the light flux is guided to the light metering sensor 108. The half mirror 105 focuses the light flux incident thereon via the lens unit 200 on a focus plate 106 when the half mirror 105 is at the position where the light flux is guided to the light metering sensor 108.

A display element 107 is a display element using a polymer network (PN) liquid crystal, and displays a frame representing a focus detection area used for automatic focus adjustment control (automatic focus (AF) control) (an AF frame). The light metering sensor 108 uses a charge accumulation type image sensor for accumulating charge depending on an amount of incident light, such as a CCD sensor or a CMOS sensor so that the light metering sensor 108 can perform not only light metering but also subject's face detection, subject tracking, and flicker detection based on an image signal output. A pentaprism 109 guides the light flux incident thereon via the lens unit 200 after being reflected by the half mirror 105 to the light metering sensor 108 and an optical finder (not illustrated). A focus detection circuit 110 performs focus detection for the AF control. An AF mirror 111 guides a part of the light flux incident thereon via the lens unit 200 after passing through the half mirror 105 to the focus detection circuit 110.

A CPU 112 is a CPU for driving control of the light metering sensor 108, and image processing, and calculation of the light metering sensor 108 (hereinafter referred to as an ICPU), and performs various types of calculation relating to light metering, subject's face detection, subject tracking, and flicker detection (detection of a change characteristic of a light amount of light from a subject) based on an output signal (an image signal) from the light metering sensor 108. A memory 113 is a memory such as a RAM or a ROM connected to the ICPU 112. While a configuration including the ICPU 112 in addition to the camera microcomputer 101 will be described in the present exemplary embodiment, a configuration in which the camera microcomputer 101 performs processing to be performed by the ICPU 112 may be used.

An operation unit 114 includes a release button for a user to instruct the camera body 100 to start a shooting preparation operation and to start a shooting operation, and a setting button for the user to perform various settings of the camera body 100. The operation unit 114 further includes a power switch for switching ON/OFF of a power supply to the camera body 100, a mode dial for the user to select an operation mode of the camera body 100 out of a plurality of operation modes, and a touch panel.

A configuration of the lens unit 200 will be described below. A lens CPU (hereinafter referred to as an LPU) 201 controls various units in the lens unit 200, for example, a focus lens, a zoom lens, and a diaphragm driving unit, and transmits information about the lens to the camera microcomputer 101.

Figure 2:
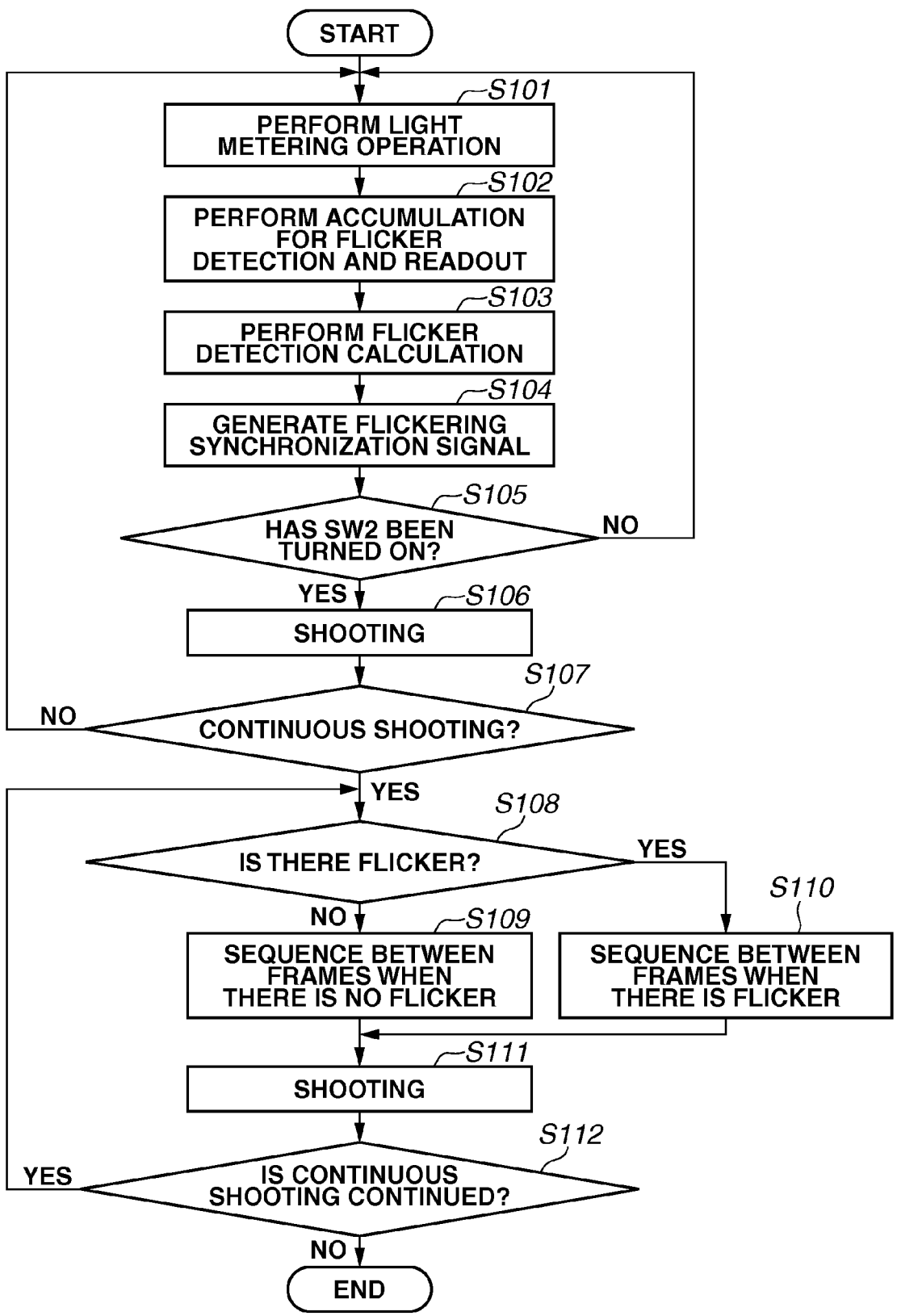
FIG. 2 is a flowchart illustrating an operation performed by an imaging apparatus according to an exemplary embodiment of the present invention for shooting with a reduced influence of flicker.

An operation for shooting with a reduced flickering influence will be described below with reference to FIG. 2. FIG. 2 is a flowchart illustrating an operation performed by the imaging apparatus according to the present exemplary embodiment for shooting with a reduced flickering influence.

If the power supply to the camera body 100 is turned on by the user operating the power switch, then in step S101, the ICPU 112 performs a light metering operation. In the light metering operation, the light metering sensor 108 performs accumulation of charge and readout of an image signal, and the ICPU 112 performs calculation relating to light metering (hereinafter referred to as light metering calculation) based on the obtained image signal to acquire a light metering value.

In the light metering operation, a time for accumulation by the light metering sensor 108 (an accumulation time) may be set to approximately integral multiples of a light amount change cycle of the flickering light source so that the light metering value does not vary due to an influence of a light amount change of the flickering light source even under a flickering light source. A frequency at which the light amount of the flickering light source changes (hereinafter referred to as a flickering frequency) is two times a commercial power supply frequency. Thus, in a region having a commercial power supply frequency of 50 Hz, the flickering frequency becomes 100 Hz, and the light amount change cycle of the flickering light source becomes 10 ms. Similarly, in a region having a commercial power supply frequency of 60 Hz, the flickering frequency becomes 120 Hz, and the light amount change cycle of the flickering light source becomes 8.33 ms.

To cope with two types of flickering frequencies, the accumulation time by the light metering sensor 108 is set to a time substantially equal to an average value between 10 ms and 8.33 ms, for example, 9 ms. Therefore, the accumulation time by the light metering sensor 108 becomes substantially equal to one light amount change cycle of the flickering light source regardless of whether the commercial power supply frequency is 50 Hz or 60 Hz. Thus, a stable light metering value can be obtained even under the flickering light source.

The camera microcomputer 101 determines an aperture value Av being an exposure control value, a shutter speed (an exposure time) Tv, International Organization for Standardization (ISO) sensitivity (imaging sensitivity) Sv based on the obtained light metering value. When determining Av, Tv, and Sv, the camera microcomputer 101 uses a program diagram previously stored in the memory 102.

In step S102, the ICPU 112 then causes the light metering sensor 108 to perform accumulation of charge for flicker detection and readout of an image signal a plurality of times, as illustrated in FIGS. 3A and 3B. FIGS. 3A and 3B illustrate timings of accumulation of charge for flicker detection and timings of readout of an image signal. Accumulation/readout is continuously performed 12 times at a frame rate of 600 fps and in a cycle of approximately 1.667 ms. 600 fps is a value equal to the least common multiple of the flickering frequencies previously estimated (100 Hz and 120 Hz). Accumulation is performed 12 times at a frame rate of 600 fps so that the accumulation is performed in a period of 20 ms as a whole. Therefore, two cycles of light amount change of the flickering light source are included in the above accumulation period, regardless of whether the commercial power supply frequency is 50 Hz or 60 Hz.

A method for driving the light metering sensor 108 at a frame rate of 600 fps (in a cycle of 1.667 ms) will be described below.

In the present exemplary embodiment, not only light metering but also subject's face detection, subject tracking, and flicker detection are performed based on the image signal output from the light metering sensor 108. To perform the subject's face detection with high accuracy, the light metering sensor 108 requires a certain number of pixels, for example, the number of pixels compliant with a Quarter Video Graphics Array (QVGA). To read out, at a frame rate of 600 fps or more, all pixel signals of the image sensor 103 having the number of pixels with which highly accurate subject's face detection can be performed, the imaging apparatus becomes complicated in circuit configuration and also increases in cost.

All the pixel signals are read out for an image signal for performing the subject's face detection, and pixel addition readout and thinning readout are performed for an image signal for performing the flicker detection, thereby adjusting the frame rate to 600 fps (a cycle of 1.667 ms).

If a CCD sensor is used as the light metering sensor 108, the number of readout lines may be reduced in a pseudo manner to shorten a readout time by pixel addition readout for adding and reading out pixel signals. For example, a readout time can be shortened, as illustrated in FIG. 4, by performing vertical pixel addition using a CCD sensor having a stripe-shaped pixel array. FIG. 4 illustrates a relationship between a vertical pixel addition number and a readout time. The relationship will be described using as an example a CCD sensor in which a readout time is 6.25 ms when all pixel signals are read out without being added (a vertical pixel addition number is 1). In the CCD sensor having a characteristic illustrated in FIG. 4, a readout time becomes 1.66 ms by performing nine pixel addition, and a frame rate can be approximately 600 fps. An image signal to be read out at this time has the one-ninth number of pixels in a vertical direction of that of an image signal read out without adding pixel signals. However, light metering values between image signals are only compared with each other in flicker detection. Thus, an image signal having a reduced number of pixels in the vertical direction may be used.

If a CMOS sensor is used as the light metering sensor 108, a total time of accumulation and readout may be adjusted to a cycle of approximately 1.667 ms by thinning readout for reading out pixel signals with a limited number of horizontal lines.

The method for driving the light metering sensor 108 at a frame rate of approximately 600 fps (in a cycle of approximately 1.667 ms) has been described above. The above-mentioned accumulation/readout cycle of the light metering sensor 108 is merely one example. The frame rate need not be approximately 600 fps (a cycle of approximately 1.667 ms). For example, the longer an accumulation time is, the more effective accumulation is for a low-illumination environment. Thus, a time required to perform accumulation once may be made longer than approximately 1.667 ms, and the frame rate may be lower than 600 fps. Alternatively, the shorter the accumulation/readout cycle is, the shorter a time required to detect flicker becomes. Thus, the time required to perform accumulation once may be made shorter than approximately 1.667 ms, and the frame rate may be made higher than 600 fps by setting a vertical pixel addition number so that a readout time becomes shorter than 1.66 ms. The relationship between the vertical pixel addition number and the readout time illustrated in FIG. 4 is merely one example. However, the farther the frame rate separates from 600 fps, the larger a deviation between the accumulation/readout cycle of the light metering sensor 108 and the light amount change cycle of the flickering light source becomes. Thus, the frame rate is desirably within ±1 to 2% of 600 fps.

If the accumulation of the charge for flicker detection and the readout of the image signal end in step S102, then in step S103, the ICPU 112 performs flicker detection calculation based on the read image signal.

FIG. 3A illustrates timings of accumulation of charge, timings of readout of an image signal, and transition of a light metering value when a commercial power supply frequency is 50 Hz. "Accumulation n" denotes n-th accumulation, "readout n" denotes readout corresponding to the accumulation n, and "AE (n)" denotes a light metering value obtained from a result of the readout n. While the number of light metering values obtained by each accumulation is one, a light amount of a flickering light source is not constant during an accumulation period. The light metering value obtained by each accumulation can be a value corresponding to a light amount of the flickering light source at a center of each accumulation period.

A light amount change cycle of the flickering light source when the commercial power supply frequency is 50 Hz is approximately 10 ms, and 10÷1.667≅6. Therefore, accumulation is performed at a timing at which a light amount of the flickering light source becomes substantially the same in six cycles, as illustrated in FIG. 3A. More specifically, a relationship of AE (n)≅AE (n+6) holds.

Similarly, a light amount change cycle of the flickering light source when the commercial power supply frequency is 60 Hz is approximately 8.33 ms, and 8.33÷1.667≅5. Therefore, accumulation is performed at a timing at which a light amount of the flickering light source becomes substantially the same in five cycles, as illustrated in FIG. 3B. More specifically, a relationship of AE (n)≅AE (n+5) holds.

On the other hand, under a light source that hardly changes in a light amount, a light metering value AE (n) is substantially constant regardless of n. Therefore, an evaluation value is calculated using the following Equations (1) and (2) based on a plurality of light metering values obtained by performing accumulation for flicker detection:

$$F50 = \sum_{n=1}^{6} |AE(n) - AE(n+6)| \qquad (1)$$

$$F60 = \sum_{n=1}^{6} |AE(n) - AE(n+5)| \qquad (2)$$

An evaluation value F50 calculated using the Equation (1) and an evaluation value F60 calculated using the Equation (2) are compared with a predetermined threshold value F_th to perform flicker detection. More specifically, if F50<F_th and F60<F_th, all the plurality of light metering values obtained by performing accumulation for flicker detection are substantially equal. Thus, it is determined that no flicker occurs. If F50<F_th and F60≥F_th, the plurality of light metering values obtained by performing accumulation for flicker detection becomes substantially equal in six cycles, and do not become substantially equal in five cycles. Thus, it is determined that the flicker having a light amount change cycle of 10 ms occurs (under the flickering light source having a commercial power supply frequency of 50 Hz).

If F50≥F_th and F60<F_th, all the plurality of light metering values obtained by performing accumulation for flicker detection become substantially equal in five cycles, and do not become substantially equal in six cycles. Thus, it is determined that the flicker having a light amount change cycle of 8.33 ms occurs (under the flickering light source having a commercial power supply frequency of 60 Hz).

When movement of the imaging apparatus such as panning and movement of a subject occur while accumulation for flicker detection is performed, a light metering value may greatly change so that F50≥F_th and F60≥F_th. In this case, the evaluation values F50 and F60 are compared with each other to perform flicker detection.

More specifically, if F50≥F_th, F60≥F_th, and F50≤F60, it is determined that the flickering having a light amount change cycle of 10 ms occurs (under the flickering light source having a commercial power supply frequency of 50 Hz). On the other hand, if F50≥F_th, F60≥F_th, and F50>F60, it is determined that the flickering having a light amount change cycle of 8.33 ms occurs (under the flickering light source having a commercial power supply frequency of 60 Hz). If F50≥F_th, F60≥F_th, and F50=F60, a light amount change cycle of the flickering light source cannot be determined. Thus, it may be determined that no flicker occurs or the flicker cannot be detected.

While the light amount change cycle of the flickering light source has been determined when F50≥F_th and F60≥F_th, the accuracy of flicker detection is low when F50≥F_th and F60≥F_th. Thus, accumulation for flicker detection may be performed again.

Figure 5:
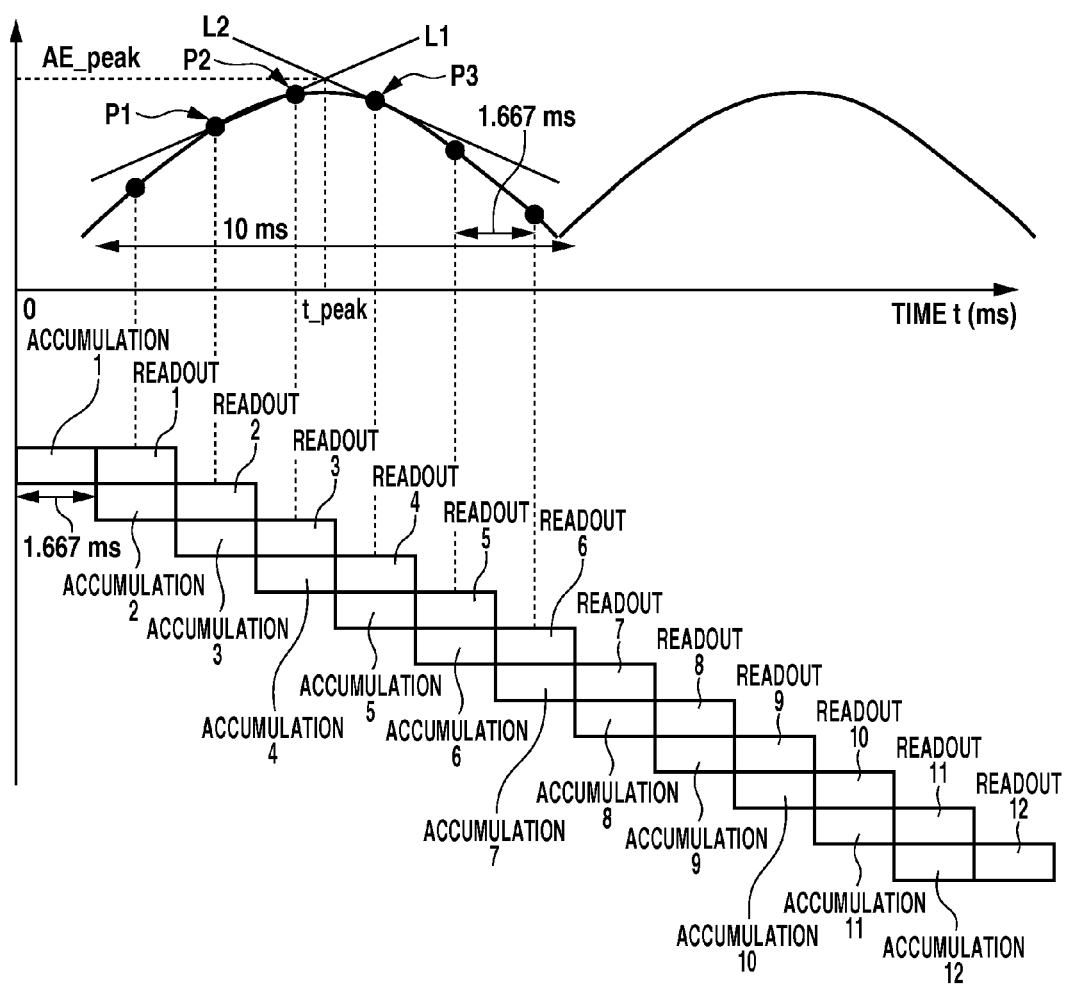
FIG. 5 illustrates an example of a method for calculating a timing of a peak of a light amount of a flickering light source.

Further, it is determined to be under the flickering light source in step S103, the ICPU 112 obtains a timing of a feature point of the flicker. FIG. 5 illustrates an example of a method for calculating a timing of a peak of a light amount of flickering light source, which is an example of a timing of a feature point of the flicker.

A point at which a maximum value of light metering values AE (1) and AE (12) is obtained is a point P2 (t (m)), AE (m)), a point of the preceding light metering result is a point P1 (t (m−1), AE (m−1)), and a point of the succeeding light metering result is a point P3 (t (m+1), AE (m+1)). A straight line passing through two points, i.e., a point at which the smaller one of AE (m−1) and AE (m+1) is taken (the point P1 in the example illustrated in FIG. 5) and the point P2 is obtained as L1=at+b, and a straight line passing through a point at which the larger one of AE (m−1) and AE (m+1) is taken (the point P3 in the example illustrated in FIG. 5) and having a slope −a is L2. When an intersection of the straight lines L1 and L2 is obtained, a peak timing t_peak when the start time of accumulation for flicker detection is 0 ms and a peak light metering value AE_peak corresponding to a light amount at a peak can be calculated.

While a method for calculating a timing at which a light amount reaches its maximum (a peak) during a light amount change of the flicker has been described in FIG. 5 as an example of a method for calculating a timing of a feature point of flicker, a timing at which the light amount reaches its minimum (a bottom) may be calculated.

Figure 6:
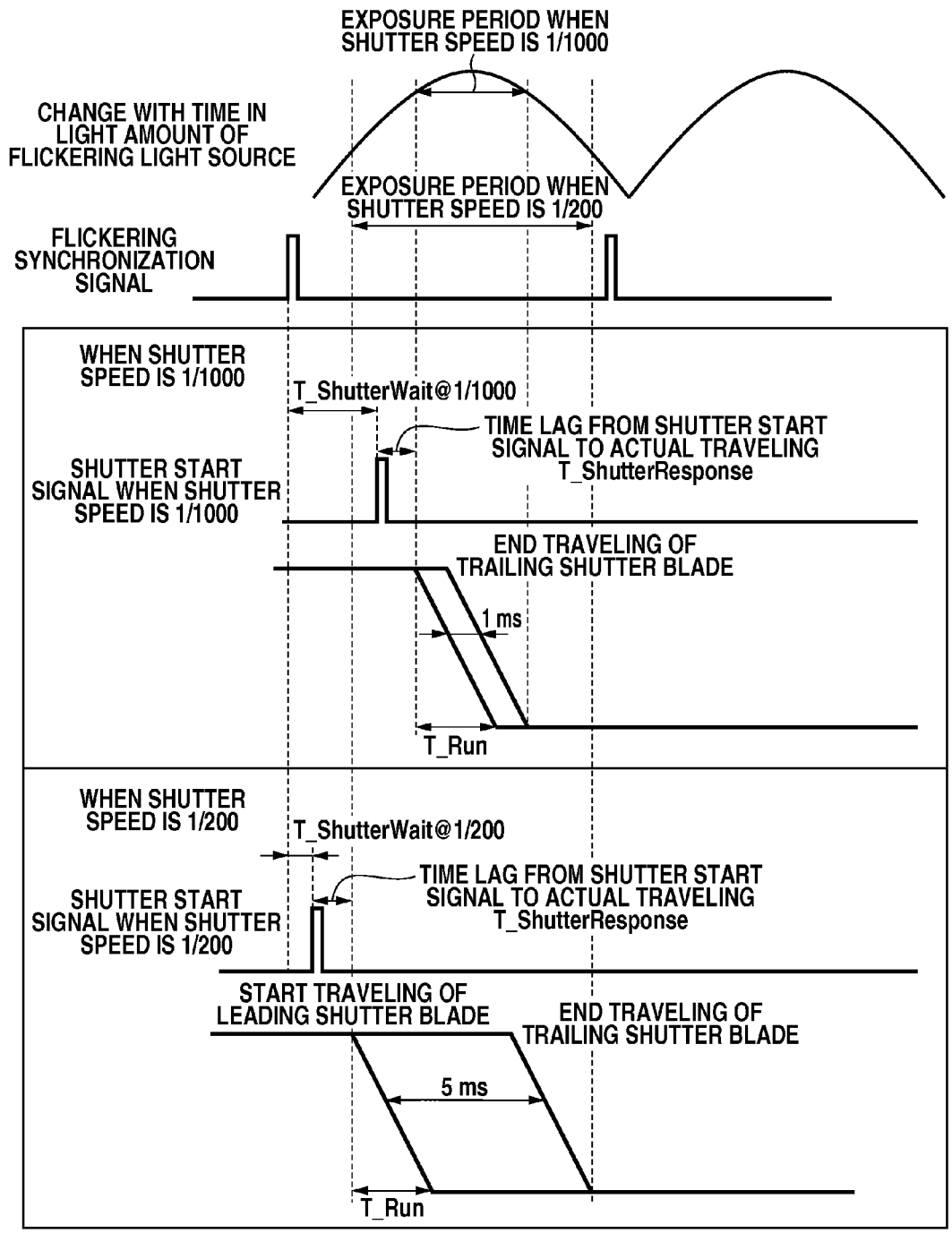
FIG. 6 illustrates a relationship between a light amount change of a flickering light source and respective generation timings of a flickering synchronization signal and a shutter start signal.

In step S104, the camera microcomputer 101 then generates a flickering synchronization signal from the flickering frequency and the timing of the light amount change, which have been obtained in step S103. The flickering synchronization signal is a signal that is generated for each light amount change cycle of the flickering light source and is synchronized with a predetermined timing of a light amount change of the flickering light source, as illustrated in FIG. 6. FIG. 6 illustrates a relationship between the light amount change of the flickering light source and respective generation timings of the flickering synchronization signal and a shutter start signal.

Referring to FIG. 6, a time T_ShutterResponse denotes a time lag from the time when the shutter start signal is generated to the time when the shutter 104 actually travels and starts to expose the first line in an imaging area of the image sensor 103. A time T_Run denotes a time from the start of the exposure of the first line in the imaging area of the image sensor 103 to the start of exposure of the last line. If the shutter 104 simultaneously starts to expose all imaging areas of the image sensor 103, T_Run=0 may hold.

A generation timing t_Flicker of the flickering synchronization signal is obtained by the following Equation (3) when the start time of accumulation for flicker detection is 0 ms:

$$t\_Flicker = t\_peak - T\_ShutterResponse - (T\_Run + TVmax)/2 + T \times n \quad (3)$$

A light amount change cycle T of the flickering light source and a peak timing t_peak when the start time of accumulation for flicker detection is 0 ms have been calculated in step S103. Here, a number "n" is assumed to be a natural number, and a shutter maximum speed TVmax serves as a threshold value to determine whether shutter control for reducing an influence of flickering is to be performed, and is previously set.

If the shutter speed is lower than 1/100 seconds, exposure is performed in a time period that is one light amount change cycle or more of the flickering light source. Thus, the influence of the flicker is reduced. Even if the shutter speed is a shutter speed at which an exposure period is less than one light amount change cycle of the flickering light source, the influence of the flicker can be relatively small if the exposure period is close to the one light amount change cycle of the flickering light source. In the present exemplary embodiment, if the shutter speed is higher than 8 ms, shutter control for reducing the influence of the flicker is performed, and TVmax=1/125 (sec) holds.

The camera microcomputer 101 sets a time T_ShutterWait serving as a waiting time from the generation of the flickering synchronization signal to the generation of the shutter start signal for instructing the shutter 104 to travel. The camera microcomputer 101 changes the time T_ShutterWait for each shutter speed to perform control so that a timing at which a light amount change of the flickering light source becomes small comes to center point of a time from the start of the exposure of the first line in the imaging area of the image sensor 103 to the end of the exposure of the last line. The time T_ShutterWait is set as expressed by the following Equation (4), for example:

$$T\_ShutterWait = (TVmax - TV)/2 \quad (4)$$

(where TV<1/125)

When the time T_ShutterWait is set as described above, control can be performed so that a timing of a peak of the light amount of the flickering light source comes to the center point of the time from the start of the exposure to the first line in the imaging area of the image sensor 103 to the end of the exposure of the last line. FIG. 7 illustrates a table in which a value of a time T_ShutterWait is associated with a value of a shutter speed. The table illustrated in FIG. 7 may be previously stored in the memory 102 or the like.

An example in which the timing of the peak of the light amount of the flickering light source is calculated in step S103, and the generation timing of the flickering synchronization signal is set based on the timing of the peak of the light amount of the flickering light source has been described above. However, if the timing of the bottom of the light amount of the flickering light source is calculated in step S103, the generation timing of the flickering synchronization signal may be set based on the timing of the bottom of the light amount of the flickering light source.

In step S105, the camera microcomputer 101 then determines whether a release button is operated by the user and a switch SW2 for instructing the start of a shooting operation is turned on. If the switch SW2 is not turned on (NO in step S105), the processing returns to step S101. A series of operations in steps S101 to S104 are repeated to respectively update the light amount change cycle of the flickering light source and the timing of the peak of the light amount of the flickering light source to the newest ones. If the series of operations in steps S101 to S104 are repeatedly performed in a cycle of approximately 100 ms, for example, a deviation in the light amount change cycle of the flickering light source in the cycle of 100 ms falls within a maximum of approximately ±0.4 ms even if a fluctuation of the light amount change cycle is within approximately ±0.4 Hz. Thus, whenever the switch SW2 is turned on, shutter control for reducing the influence of the flickering can be performed with high accuracy.

The operations in steps S101 to S104 need not be repeated in a similar manner but the light metering operation performed in step S101 and a flicker detection operation performed in steps S102 to S104 may be performed in different cycles. As described above, a cycle of approximately 100 ms is sufficient to perform the flicker detection operation. However, to improve responsivity to a change in luminance of the subject, the light metering operation may be performed in a shorter cycle than the cycle of the flicker detection operation, for example, in a cycle of approximately 50 ms.

If the switch SW2 is turned on (YES in step S105), the processing proceeds to step S106. In step S106, the camera microcomputer 101 delays a first flickering synchronization signal after the switch SW2 is turned on by the time T_ShutterWait corresponding to the determined shutter speed to generate a shutter start signal. Then, the shutter 104 is driven in response to the generated shutter start signal to start shooting.

As described above, the shutter start signal is delayed by the time T_ShutterWait corresponding to the shutter speed with respect to the flickering synchronization signal, as the shutter control for reducing the influence of the flicker. Thus, as illustrated in FIG. 6, the timing of the peak of the light amount of the flickering light source comes to a center point of the time from the start of the exposure of the first line in the imaging area of the image sensor 103 to the end of the exposure of the last line regardless of whether the shutter speed is 1/1000 seconds or 1/200 seconds. Thus, exposure unevenness within one image due to the influence of the flicker can be reduced by controlling a shooting timing based on the timing of the feature point of the flicker. If the shooting ends, then in step S107, the camera microcomputer 101 determines whether continuous shooting is performed. It may be determined whether continuous shooting is performed depending on whether a state where the switch SW2 is turned on is maintained or whether a continuous shooting mode is selected as an operation mode.

If the continuous shooting is not performed (NO in step S107), the processing returns to step S101. If the continuous shooting is performed (YES in step S107), the processing proceeds to step S108.

In step S108, the camera microcomputer 101 determines whether there is flicker. The determination result in step S103 may be used. If there is no flicker (NO in step S108), the processing proceeds to step S109. If there is flicker (YES in step S108), the processing proceeds to step S110.

An operation sequence between frames of the continuous shooting (in shooting intervals when the continuous shooting is performed) will be described with reference to FIGS. 8A and 8B. FIGS. 8A and 8B illustrate an operation sequence of the light metering sensor 108 and the ICPU 112 between frames of continuous shooting, and FIGS. 8A and 8B respectively illustrate a case where there is no flickering and a case where there is flickering. In step S109, the light metering sensor 108 and the ICPU 112 operate as illustrated in FIG. 8A. In step S110, the light metering sensor 108 and the ICPU 112 operate as illustrated in FIG. 8B.

The operation sequence of the light metering sensor 108 and the ICPU 112 between the frames of the continuous shooting when there is no flicker will be described below with reference to FIG. 8A.

The half mirror 105, which has been in a mirror up state to guide a light flux to the image sensor 103 during shooting, moves to a mirror down state to guide the light flux to the light metering sensor 108 after the shooting. Immediately after moving from the mirror up state to the mirror down state, the half mirror 105 is bounced (hereinafter referred to as mirror bounce) due to an impact caused by the stop of the movement. When the half mirror 105 enters a stable mirror down state after the mirror bounce ends, the light metering sensor 108 performs accumulation of charge for obtaining an image signal used for light metering and subject tracking (hereinafter referred to as accumulation for AE and tracking) and readout of the image signal. The readout of the image signal required for the accumulation for AE and tracking is desirably short to increase the frame speed of the continuous shooting (continuous shooting speed). If the CCD sensor is used as the light metering sensor 108, the pixel addition readout described above is performed. If the CMOS sensor is used as the light metering sensor 108, the thinning readout described above is performed. The ICPU 112 performs calculation relating to subject tracking (hereinafter referred to as tracking calculation) and light metering calculation based on the obtained image signal.

After performing the readout of the image signal required for the accumulation for AE and tracking, the light metering sensor 108 performs accumulation of charge for obtaining an image signal used for subject's face detection (hereinafter referred to as accumulation for face detection) and readout of the image signal. In the readout of the image signal required for the accumulation for face detection, the number of pixels add in the pixel addition readout and the number of lines thinned out in the thinning readout are made smaller than those in the readout of the image signal required for the accumulation for AE and tracking to perform the face detection with high accuracy. In the present exemplary embodiment, not the pixel addition readout nor the thinning readout but readout of all pixels is performed. The ICPU 112 performs calculation relating to subject's face detection (hereinafter referred to as face detection calculation) based on the obtained image signal. A result of the face detection calculation is used for the subsequent tracking calculation and light metering calculation. For example, the tracking calculation is performed using a face area of the subject detected by the face detection calculation as a tracking target, and the light metering calculation is performed by increasing weighting of the face area of the subject detected by the face detection calculation.

To increase the frame speed of the continuous shooting (continuous shooting speed), the accumulation for face detection is desirably performed in parallel with the tracking calculation and the light metering calculation by the ICPU 112. The readout of the image signal required for the accumulation for face detection may be performed while the light flux is not guided to the light metering sensor 108. Thus, to increase the frame speed of the continuous shooting (continuous shooting speed), the accumulation for face detection is desirably performed while the half mirror 105 is moved to the mirror up state.

When the half mirror 105 enters a stable mirror up state after the mirror bounce after the movement ends, the subsequent shooting (exposure) is performed.

When there is no flicker, the continuous shooting is performed in such an operation sequence until an ON state of the switch SW2 is released. More specifically, accumulation of charge for flicker detection and readout of an image signal (hereinafter referred to as accumulation for flicker detection/readout) are not performed, flicker is not newly detected, and a timing of a feature point of the flicker is not calculated.

The operation sequence of the light metering sensor 108 and the ICPU 112 between the frames of the continuous shooting when there is flicker will be described below with reference to FIG. 8B.

When the half mirror 105 enters a stable mirror down state after the mirror bounce ends, the light metering sensor 108 performs accumulation for flicker detection/readout. The accumulation for flicker detection/readout is performed in a similar method to the method described in step S102 illustrated in FIG. 2.

The light source is unlikely to change to another light source having a different flickering frequency during the continuous shooting, and a frequency to be a reference of the flickering frequency during the continuous shooting can be constant. The number of times of the accumulation for flicker detection may be smaller than the number of times in step S102 illustrated in FIG. 2 as long as a timing of a peak of a light amount of a flickering light source can be calculated. For example, a number of times of accumulation corresponding to at least one light amount change cycle of the flickering light source may be sufficient to calculate the timing of the peak of the light amount of the flickering light source. In a case where accumulation is performed five or more times, or six or more times when the light amount change cycle of the flickering light source is approximately 8.33 ms or approximately 10 ms, respectively, the timing of the peak of the light amount of the flickering light source can be calculated with high accuracy. As described above, if simple accumulation for flicker detection is performed to calculate the timing of the peak of the light amount of the flickering light source between the frames of the continuous shooting, a decrease in the frame speed of the continuous shooting (continuous shooting speed) can be suppressed.

The ICPU 112 performs the flicker detection calculation based on the obtained image signal. The flicker detection calculation is performed in a similar method to the method described in step S103 illustrated in FIG. 2. As described above, a frequency to be a reference of the flickering frequency during the continuous shooting can be constant. Thus, only the timing of the peak of the light amount of the flickering light source may be calculated without the light amount change cycle of the flickering light source being determined. At this time, a timing of a feature point of the flicker represented by the newest one of detection results is calculated.

After the flicker detection calculation ends, the camera microcomputer 101 updates the flickering synchronization signal to the newest one based on the detection result of the flicker detection calculation. More specifically, the shooting timing is controlled based on the newest timing of the feature point of the flicker calculated after the previous shooting.

The light metering sensor 108 performs the accumulation for AE and tracking and the readout of the image signal when the accumulation for flicker detection/readout ends. To increase the frame speed of the continuous shooting (continuous shooting speed), the accumulation for AE and tracking is desirably performed in parallel with the flicker detection calculation by the ICPU 112.

Accumulation for face detection and various types of calculation to be subsequently performed are similar to those when there is no flicker described with reference to FIG. 8A, and hence description thereof is not repeated.

After the light metering calculation ends, the camera microcomputer 101 delays a shutter start signal by the time T_ShutterWait corresponding to the shutter speed determined based on the newest result of the light metering calculation from the newest flickering synchronization signal to generate a shutter start signal, and performs the subsequent shooting.

When there is flicker, the continuous shooting is performed in such an operation sequence until an ON state of the switch SW2 is released.

Figure 9A:
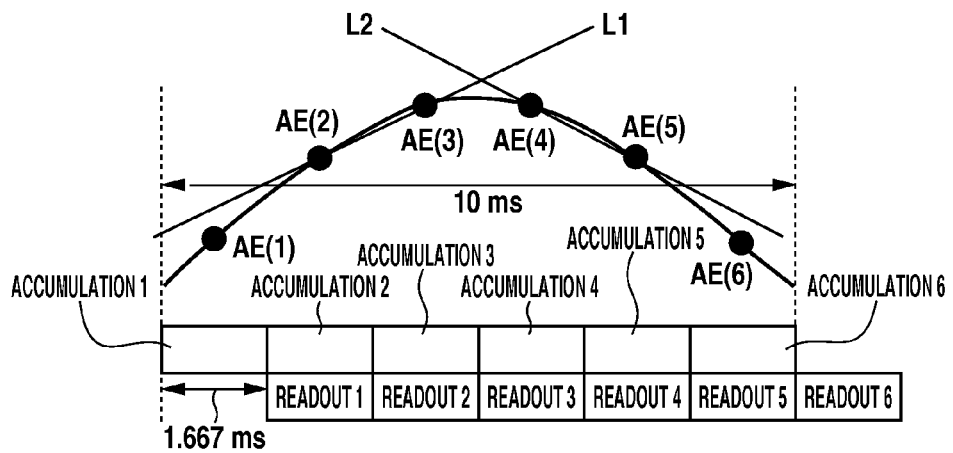
FIGS. 9A and 9B illustrate timing calculation of a feature point of flickering under a flickering light source having a commercial power supply of 50 Hz.
Figure 9B:
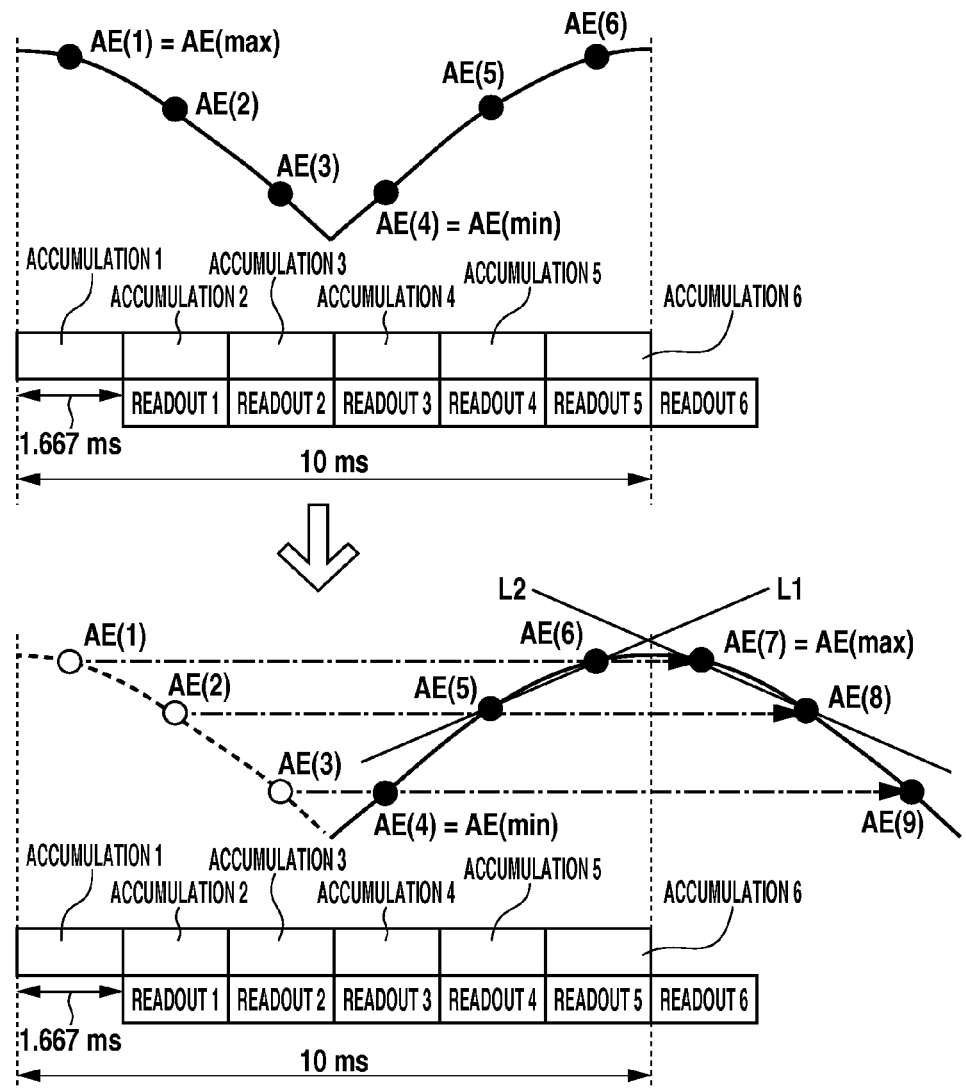

Details of timing calculation, between frames of continuous shooting to be performed when there is flicker, of a feature point of the flicker will be described with reference to FIGS. 9A, 9B, 9C, 10A, 10B, and 10C. FIGS. 9A, 9B, and 9C illustrate timing calculation of a feature point of the flicker under the flickering light source having a commercial power supply of 50 Hz. FIG. 9A illustrates a case where accumulation for flicker detection is started at a timing of a bottom of a light amount of the flickering light source, and FIG. 9B illustrates a case where accumulation for flicker detection is started at a timing of a peak of the light amount of the flickering light source. FIGS. 10A, 10B, and 10C illustrate timing calculation of a feature point of flicker under the flickering light source having a commercial power supply of 60 Hz. FIG. 10A illustrates a case where accumulation for flicker detection is started at a timing of a bottom of a light amount of the flickering light source, and FIG. 10B illustrates a case where accumulation for flicker detection is started at a timing of a peak of the light amount of the flickering light source.

A light amount change cycle of the flickering light source having the commercial power supply of 50 Hz is approximately 10 ms. Thus, when the accumulation for flicker detection is started at the timing of the bottom of the light amount of the flickering light source as illustrated in FIG. 9A, light metering values preceding and succeeding the peak can be obtained in accumulations 1 to 6. In this case, the timing of the peak of the light amount of the flickering light source is calculated in a similar method to the method described in step S103. More specifically, if an output signal taking a maximum value out of a plurality of output signals is not an output signal obtained first or last out of the plurality of output signals, a timing at which the light amount reaches its maximum in a light amount change of the flicker is calculated based on the output signal taking the maximum value and the output signals obtained before and after the output signal taking the maximum value.

However, when the accumulation for flicker detection is started at the timing of the peak of the light amount of the flickering light source as illustrated in FIG. 9B, a light metering value AE (1) or AE (6) out of light metering values AE (1) to AE (6) becomes a maximum light metering value AE (max) (AE (1)=AE (max) in FIG. 9B). In such a case, there is no light metering value before or after the peak. Thus, the timing of the peak of the light amount of the flickering light source cannot be calculated in the method described in step S103.

Therefore, a minimum light metering value AE (min) out of the light metering values AE (1) to AE (6) is calculated. In FIG. 9B, AE (4)=AE (min). After the minimum light metering value AE (min) is calculated, six is added to indices of the light metering values obtained before the minimum light metering value AE (min) (AE (1) to AE (3) in FIG. 9B), to obtain light metering values AE (7) to AE (9). In FIG. 9B, an output signal taking a maximum value out of a plurality of output signals is an output signal obtained first out of the plurality of output signals. In such a case, a timing at which the light amount reaches its maximum in a light amount change of the flickering is calculated based on the output signal taking the maximum value, the output signal obtained immediately after the output signal taking the maximum value, and the output signal obtained later by a time corresponding to a flickering cycle than the output signal taking the maximum value. Assuming that the light amount change cycle of the flickering light source is substantially constant, the light metering values AE (1) to AE (3) can be substantially equal to the light metering values AE (7) to AE (9) respectively obtained after one cycle therefrom. Therefore, even if the light metering values AE (1) to AE (3) are substituted for the light metering values AE (7) to AE (9), a calculation result is hardly affected. Thus, even in a case as illustrated in FIG. 9B, the timing of the peak of the light amount of the flickering light source can be calculated in the method described in step S103 from the light metering values preceding and succeeding the maximum light metering value AE (max).

As a case similar to FIG. 9B, an output signal taking a maximum value out of a plurality of output signals may be an output signal obtained last out of the plurality of output signals. In such a case, a timing at which a light amount reaches its maximum in a light amount change of the flicker is calculated based on the output signal taking the maximum value, the output signal obtained immediately before the output signal taking the maximum value, and the output signal obtained earlier by a time corresponding to a flickering cycle than the output signal taking the maximum value.

The timing of the peak of the light amount of the flickering light source can also be calculated by using a similar method even under the flickering light source having a commercial power supply of 60 Hz.

If a light metering value AE (3) takes a maximum value, and light metering values preceding and succeeding the peak of the light amount of the flickering light source can be obtained in accumulations 1 to 6 as illustrated in FIG. 10A, the timing of the peak may be calculated using a similar method to the method described in step S103. On the other hand, if a light metering value AE (1) takes a maximum value, and light metering values preceding and succeeding the peak of the light amount of the flickering light source cannot be obtained in accumulations 1 to 6 as illustrated in FIG. 10B, the timing of the peak may be calculated using a similar method to that illustrated in FIG. 9B.

A similar idea may also be used even when the timing of the bottom of the light amount of the flickering light source is calculated. In other words, a maximum value and a minimum value in the description of FIGS. 9A, 9B, 9C, 10A, 10B, and 10C may be respectively replaced with a minimum value and a maximum value.

As described above, the timing of the peak of the light amount of the flickering light source can be accurately calculated even the number of times smaller than the number of times of accumulation for flicker detection. Therefore, accumulation for calculating the timing of the peak of the light amount of the flickering light source is performed the number of times smaller than the number of times of accumulation for flicker detection in shooting intervals when continuous shooting is performed so that a good image can be captured while a decrease in a frame speed during the continuous shooting is suppressed.

As described above, according to the present exemplary embodiment, even if the commercial power supply frequency slightly fluctuates, the timing of the peak of the light amount of the flickering light source is calculated between frames of the continuous shooting, and each shooting is performed to match the calculated timing of the peak. Therefore, a good image can be acquired.

While an example in which the imaging apparatus includes the half mirror 105, and the light metering sensor 108 performs accumulation for various applications when the half mirror 105 is in a mirror down state between frames of continuous shooting has been described in the above-mentioned exemplary embodiment, the imaging apparatus need not include the half mirror 105. In this case, the imaging apparatus need not include the light metering sensor 108. The image sensor 103 may perform accumulation for various applications similar to that performed by the light metering sensor 108.

The order of various types of accumulation by the light metering sensor 108 illustrated in FIGS. 8A and 8B is one example. Various types of accumulation may be performed in a different order.

While accumulation of charge for obtaining an image signal used for light metering and accumulation of charge for obtaining an image signal used for subject tracking are collected to one in FIGS. 8A and 8B, the two types of accumulation may be separately performed.

The subject tracking and the subject's face detection need not be performed. Between the frames of the continuous shooting, the accumulation for flicker detection need not be performed when there is no flicker and may be performed only when there is flicker. When there is flicker, the accumulation for flicker detection is performed so that the frame speed of the continuous shooting becomes lower than that when there is no flicker. However, the influence of the flicker can be reduced with high accuracy. A good image can be obtained even if the shooting is performed under the flickering light source. On the other hand, when there is no flickering, the accumulation for flicker detection is not performed so that the frame speed of the continuous shooting can be prevented from being uselessly reduced.

If there is a sufficient time to perform accumulation for flicker detection/readout in shooting intervals even between the frames of the continuous shooting, the accumulation may be performed the number of times of accumulation for flicker detection. For example, in a configuration in which the frame speed of the continuous shooting can be set, if the set frame speed is less than a predetermined value (lower than a predetermined speed), the accumulation may be performed the number of times of accumulation for flicker detection. In this case, light metering values preceding and succeeding at least one peak of the light amount of the flickering light source can be obtained. Thus, the timing of the peak of the light amount of the flickering light source can be more accurately calculated without the necessity of using the method described in FIGS. 9B and 10B.

Even in a case other than the continuous shooting, a first operation mode in which accumulation of charge for flicker detection is performed a plurality of times and a second operation mode in which a timing of a feature point of the flicker is calculated after accumulation of charge is performed a number of times smaller than that in the first operation mode may be switched. For example, the camera microcomputer 101 may switch the first operation mode and the second operation mode in a situation where it can be determined that flicker detection result is unlikely to change in addition to switching the first operation mode and the second operation mode before the first frame of continuous shooting and in shooting intervals. An example of the situation where the flicker detection result is unlikely to change includes a situation where a switch SW1 for issuing an instruction to start a shooting preparation operation is turned on by a release button being operated. In the second operation mode, the number of times of accumulation by the light metering sensor 108 is smaller than that in the first operation mode. Thus, in the second mode, power consumption can be suppressed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-100547 filed May 10, 2013, which is hereby incorporated by reference herein in its entirety.

What is claimed is:

1. An imaging apparatus comprising:
an image sensor that makes continuous shootings in response to a request for continuous shooting from a user;
a light meter that obtains a light amount of periodically changing light before an initial shooting of the continuous shootings, and obtains a light amount of the periodically changing light between the initial shooting and a subsequent shooting of the continuous shootings; and
at least one processor that calculates, based on the light amount obtained before the initial shooting of the continuous shootings, information regarding a cycle interval of the periodically changing light and a first timing at which a light amount of the periodically changing light satisfies a predetermined brightness level, and
calculates, based on the calculated information regarding the cycle interval and the first timing, an exposure start timing of the initial shooting;
wherein the processor calculates, based on the light amount obtained between the initial shooting and the subsequent shooting, a second timing at which a light amount of the periodically changing light satisfies the predetermined brightness level, and
calculates, based on the calculated information regarding the cycle interval and the second timing, an exposure start timing of the subsequent shooting,
wherein the processor calculates the exposure start timing of the initial shooting, by adding the first timing to the information regarding the cycle interval, and
wherein the processor calculates the exposure start timing of the subsequent shooting, by adding the second timing to the information regarding the cycle interval.

2. The imaging apparatus according to claim 1,
wherein the light meter obtains a light amount of the periodically changing light by performing light metering a first number of times before the initial shooting of the continuous shootings, and obtains a light amount of the periodically changing light by performing light metering a second number of times between the initial shooting and the subsequent shooting of the continuous shootings,
wherein the processor calculates the information regarding the cycle interval based on a plurality of light metering results obtained by the light meter performing the light metering the first number of times before the initial shooting of the continuous shootings, and calculates the first timing at which the light amount of the periodically changing light satisfies the predetermined brightness level based on the plurality of light metering results obtained by the light meter performing the light metering the first number of times before the initial shooting of the continuous shootings, and
wherein the processor does not calculate the information regarding the cycle interval based on the plurality of light metering results obtained by the light meter performing the light metering the second number of times between the initial shooting and a subsequent shooting of the continuous shootings, and the processor calculates the second timing at which a light amount of the periodically changing light satisfies the predetermined brightness level based on the plurality of light metering results obtained by the light meter performing the light metering the second number of times between the initial shooting and a subsequent shooting of the continuous shootings.

3. The imaging apparatus according to claim 2,
wherein the first number of times the light meter performs light metering before the initial shooting of the continuous shootings is greater than the second number of times the light meter performs light metering between the initial shooting and the subsequent shooting of the continuous shootings.

4. The imaging apparatus according to claim 2, wherein the light meter performs the light metering the first number of times in the cycle interval before an initial shooting of the continuous shootings, and performs the light metering the second number of times in the cycle interval between the initial shooting and the subsequent shooting of the continuous shootings.

5. The imaging apparatus according to claim 1,
wherein the processor calculates, as the first timing, a timing at which the light amount of the periodically changing light satisfies a peak brightness level before the initial shooting of the continuous shootings, and
wherein the processor calculates, as the second timing, a timing at which the light amount of the periodically changing light satisfies a peak brightness level between the initial shooting and the subsequent shooting of the continuous shootings.

6. The imaging apparatus according to claim 1, wherein a number of times the light meter obtains a light amount of periodically changing light between the initial shooting and the subsequent shooting of the continuous shooting is less than a number of times the light meter obtains a light amount of periodically changing light before the initial shooting of the continuous shooting.

7. The imaging apparatus according to claim 1,
wherein the image sensor makes the continuous shootings at a predetermined shutter speed,
wherein the processor calculates the exposure start timing of the initial shooting, by adding the first timing to a period or a fraction thereof of the shutter speed, and
wherein the processor calculates the exposure start timing of the subsequent shooting, by adding the second timing to the period or a fraction thereof of the shutter speed.

8. An imaging apparatus comprising:
an image sensor that makes continuous shootings in response to a continuous shooting request from a user;
a light meter that obtains a first number of light amounts by metering periodically changing light the first number of times before an initial shooting of the continuous shootings, and obtains a second number of light amounts by metering the periodically changing light the second number of times between the initial shooting and a subsequent shooting of the continuous shootings;
at least one processor that calculates, based on the first number of light amounts obtained by the light meter before the initial shooting of the continuous shootings, a first timing at which a light amount of the periodically changing light satisfies a predetermined brightness level, and
calculates, based on the first timing, an exposure start timing of the initial shooting;
wherein the processor calculates, based on the second number of light amounts obtained by the light meter between the initial shooting and the subsequent shooting, a second timing at which a light amount of the periodically changing light satisfies the predetermined brightness level, and calculates, based on the second timing, an exposure start timing of the subsequent shooting,
wherein the first number is larger than the second number,
wherein the processor calculates the exposure start timing of the initial shooting, by adding the first timing to information regarding a cycle interval of the periodically changing light, and
wherein the processor calculates the exposure start timing of the subsequent shooting, by adding the second timing to the information regarding the cycle interval of the periodically changing light.

9. A method for controlling an imaging apparatus including an image sensor, the method comprising:
making continuous shootings using the image sensor in response to a request for continuous shooting from a user;
performing light metering using a light meter that obtains a light amount of periodically changing light before an initial shooting of the continuous shootings, and obtains a light amount of the periodically changing light between the initial shooting and a subsequent shooting of the continuous shootings;
calculating, using at least one processor, based on the light amount obtained before the initial shooting of the continuous shootings, information regarding a cycle interval of the periodically changing light and a first timing at which a light amount of the periodically changing light satisfies a predetermined brightness level;
calculating, using the at least one processor, based on the calculated information regarding the cycle interval and the first timing, an exposure start timing of the initial shooting; and
calculating, using the at least one processor, based on the light amount obtained between the initial shooting and the subsequent shooting, a second timing at which a light amount of the periodically changing light satisfies the predetermined brightness level; and
calculating, using the at least one processor, based on the calculated information regarding the cycle interval and the second timing, an exposure start timing of the subsequent shooting,
wherein the processor calculates the exposure start timing of the initial shooting, by adding the first timing to the information regarding the cycle interval, and
wherein the processor calculates the exposure start timing of the subsequent shooting, by adding the second timing to the information regarding the cycle interval.

10. A method for controlling an imaging apparatus including an image sensor, the method comprising;
making continuous shootings using the image sensor in response to a request for continuous shooting from a user;
performing light metering using a light meter that obtains a first number of light amounts by metering periodically changing light the first number of times before an initial shooting of the continuous shootings, and obtains a second number of light amounts by metering the periodically changing light the second number of times between the initial shooting and a subsequent shooting of the continuous shootings;
calculating, using at least one processor, based on the first number of light amounts obtained by the light meter before the initial shooting of the continuous shootings, a first timing at which a light amount of the periodically changing light satisfies a predetermined brightness level;

calculating, using the at least one processor, based on the first timing, an exposure start timing of the initial shooting;

calculating, using the at least one processor, based on the second number of light amounts obtained by the light meter between the initial shooting and the subsequent shooting, a second timing at which a light amount of the periodically changing light satisfies the predetermined brightness level; and calculating, using the at least one processor, based on the second timing, an exposure start timing of the subsequent shooting, wherein the first number is larger than the second number, wherein the at least one processor calculates the exposure start timing of the initial shooting, by adding the first timing to information regarding a cycle interval of the periodically changing light, and wherein the at least one processor calculates the exposure start timing of the subsequent shooting, by adding the second timing to the information regarding the cycle interval of the periodically changing light.

11. A non-transitory computer-readable storage medium storing a program for causing a computer to execute a method for controlling an imaging apparatus including an image sensor, the method comprising:

making continuous shootings using the image sensor in response to a request for continuous shooting from a user;

performing light metering using a light meter that obtains a light amount of periodically changing light before an initial shooting of the continuous shootings, and obtains a light amount of the periodically changing light between the initial shooting and a subsequent shooting of the continuous shootings;

calculating, using at least one processor, based on the light amount obtained before the initial shooting of the continuous shootings, information regarding a cycle interval of the periodically changing light and a first timing at which a light amount of periodically changing light satisfies a predetermined brightness level;

calculating, using the at least one processor, based on the calculated information regarding the cycle interval and the first timing, an exposure start timing of the initial shooting;

calculating, using the at least one processor, based on the light amount obtained between the initial shooting and the subsequent shooting, a second timing at which a light amount of the periodically changing light satisfies the predetermined brightness level; and calculating, using the at least one processor, based on the calculated information regarding the cycle interval and the second timing, an exposure start timing of the subsequent shooting, wherein the processor calculates the exposure start timing of the initial shooting, by adding the first timing to the information regarding the cycle interval, and wherein the processor calculates the exposure start timing of the subsequent shooting, by adding the second timing to the information regarding the cycle interval.

12. A non-transitory computer-readable storage medium storing a program for causing a computer to execute a method for controlling an imaging apparatus including an image sensor, the method comprising:

making continuous shootings using the image sensor in response to a request for continuous shooting from a user;

performing light metering using a light meter that obtains a first number of light amounts by metering periodically changing light the first number of times before an initial shooting of the continuous shootings, and obtains a second number of light amounts by metering the periodically changing light the second number of times between the initial shooting and a subsequent shooting of the continuous shootings;

calculating, using at least one processor, based on the first number of light amounts obtained by the light meter before the initial shooting of the continuous shootings, a first timing at which a light amount of the periodically changing light satisfies a predetermined brightness level;

calculating, using the at least one processor, based on the first timing, an exposure start timing of the initial shooting;

calculating, using the at least one processor, based on the second number of light amounts obtained by the light meter between the initial shooting and the subsequent shooting, a second timing at which a light amount of the periodically changing light satisfies the predetermined brightness level, and calculating, using the at least one processor, based on the second timing, an exposure start timing of the subsequent shooting, wherein the first number is larger than the second number, wherein the at least one processor calculates the exposure start timing of the initial shooting, by adding the first timing to information regarding a cycle interval of the periodically changing light, and wherein the at least one processor calculates the exposure start timing of the subsequent shooting, by adding the second timing to the information regarding the cycle interval of the periodically changing light.

* * * * *